US009126771B2

(12) United States Patent
Saison et al.

(10) Patent No.: US 9,126,771 B2
(45) Date of Patent: Sep. 8, 2015

(54) METHOD AND DEVICE FOR TRANSFERRING CUTOUTS FOR PACKAGING BOXES

(75) Inventors: Philippe Saison, Daix (FR); Thomas Bruneau, Chenove (FR); Franck Menegazzi, Dijon (FR); Yves Clauss, Gervy (FR); Didier Desertot, Arc-sur-Tille (FR)

(73) Assignee: OTOR, Puteaux (FR)

( * ) Notice: Subject to any disclaimer, the term of this patent is extended or adjusted under 35 U.S.C. 154(b) by 0 days.

(21) Appl. No.: 13/637,875

(22) PCT Filed: Mar. 28, 2011

(86) PCT No.: PCT/FR2011/000181
§ 371 (c)(1),
(2), (4) Date: Oct. 18, 2012

(87) PCT Pub. No.: WO2011/124782
PCT Pub. Date: Oct. 13, 2011

(65) Prior Publication Data
US 2013/0108408 A1 May 2, 2013

(30) Foreign Application Priority Data
Mar. 29, 2010 (FR) .................................... 10 01279

(51) Int. Cl.
*B65G 59/04* (2006.01)
*B65H 3/08* (2006.01)
*B65H 3/46* (2006.01)

(52) U.S. Cl.
CPC .............. *B65G 59/04* (2013.01); *B65H 3/0816* (2013.01); *B65H 3/46* (2013.01);
(Continued)

(58) Field of Classification Search
USPC ............. 271/106, 107, 91; 345/426; 382/153, 382/154, 199; 414/796.5, 796.6, 796.7, 414/796.9, 797, 797.1; 700/259; 702/152
See application file for complete search history.

(56) References Cited

U.S. PATENT DOCUMENTS

| 4,105,925 | A | * | 8/1978 | Rossol et al. ............ 250/559.37 |
| 4,803,735 | A | * | 2/1989 | Nishida et al. ................ 382/151 |

(Continued)

FOREIGN PATENT DOCUMENTS

| EP | 0639519 A1 | 2/1995 |
| EP | 1923341 A2 | 5/2008 |

(Continued)

OTHER PUBLICATIONS

International Search Report dated Jul. 29, 2011 of PCT/FR2011/000181.

*Primary Examiner* — Gregory Adams
(74) *Attorney, Agent, or Firm* — Banner & Witcoff, Ltd.

(57) ABSTRACT

The present invention relates to a method and device for transferring cutouts (6), for manufacturing packaging boxes having polygonal cross-sections, from a magazine (3) from a vertical stack, consisting of at least one stack (4, 5) of cutouts made of a cardboard or corrugated cardboard sheet material comprising notches. The method and device of the invention involve locating the top cutout of the stack using a camera (10), preliminarily detaching the cutout from the remainder of the stack, gripping, by means of suction, the thus-located top cutout, moving said cutout by means of a robotic arm (17) and releasing same to a next station, for or prior to subsequent shaping, and repeating the above cycle of steps with the next top cutout.

17 Claims, 12 Drawing Sheets

US 9,126,771 B2
Page 2

(52) U.S. Cl.
CPC    *B31B 2201/0241* (2013.01); *B31B 2201/0247* (2013.01); *B31B 2201/0282* (2013.01); *B65H 2301/5121* (2013.01); *B65H 2511/232* (2013.01); *B65H 2553/42* (2013.01); *B65H 2555/31* (2013.01); *B65H 2701/1764* (2013.01); *B65H 2701/1766* (2013.01)

(56) References Cited

U.S. PATENT DOCUMENTS

| | | | | |
|---|---|---|---|---|
| 4,873,651 | A | * | 10/1989 | Raviv .............................. 700/259 |
| 5,392,630 | A | * | 2/1995 | Marinoni et al. ................ 72/420 |
| 5,943,476 | A | * | 8/1999 | Dougherty et al. ............ 700/259 |
| 5,971,906 | A | * | 10/1999 | Tharpe et al. .................. 493/131 |
| 6,024,530 | A | * | 2/2000 | Kleineisel et al. ......... 414/752.1 |
| 6,527,500 | B1 | * | 3/2003 | Gelardi et al. ............. 414/788.1 |
| 6,611,345 | B1 | * | 8/2003 | Luxem ........................... 356/614 |
| 6,665,588 | B2 | * | 12/2003 | Watanabe et al. ............. 700/259 |
| 6,868,306 | B2 | * | 3/2005 | Nagasawa ..................... 700/213 |
| 6,874,780 | B2 | * | 4/2005 | Rebeaud ........................ 271/154 |
| 6,886,827 | B2 | * | 5/2005 | Dachtler ........................ 271/106 |
| 7,645,111 | B2 | * | 1/2010 | Mori et al. ..................... 414/676 |
| 2003/0104915 | A1 | * | 6/2003 | Seidel et al. .................. 493/309 |
| 2008/0277460 | A1 | * | 11/2008 | Mohn et al. ................... 229/108 |
| 2009/0057980 | A1 | * | 3/2009 | Gibson ......................... 271/3.09 |
| 2009/0116728 | A1 | * | 5/2009 | Agrawal et al. ............... 382/154 |

FOREIGN PATENT DOCUMENTS

| | | |
|---|---|---|
| WO | 03004387 A2 | 1/2003 |
| WO | 2006108409 A1 | 10/2006 |
| WO | 2009112050 A1 | 9/2009 |

\* cited by examiner

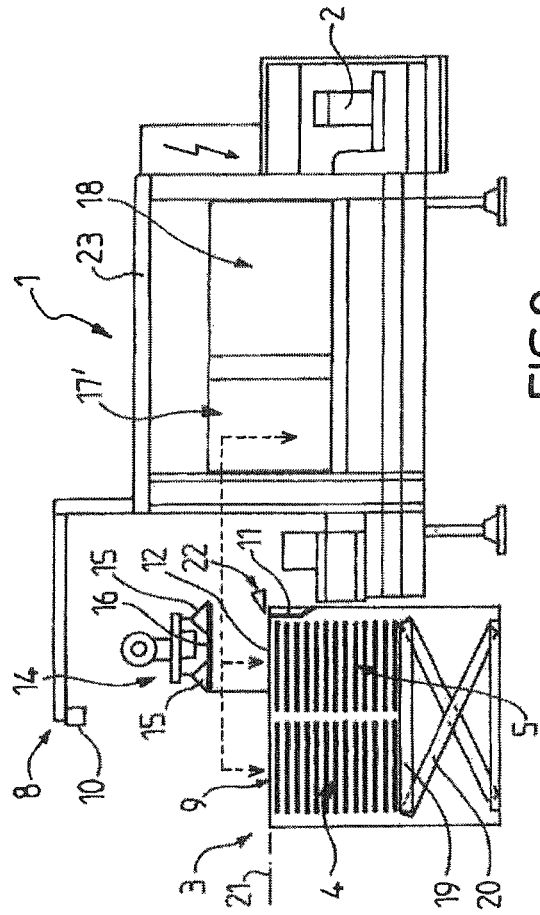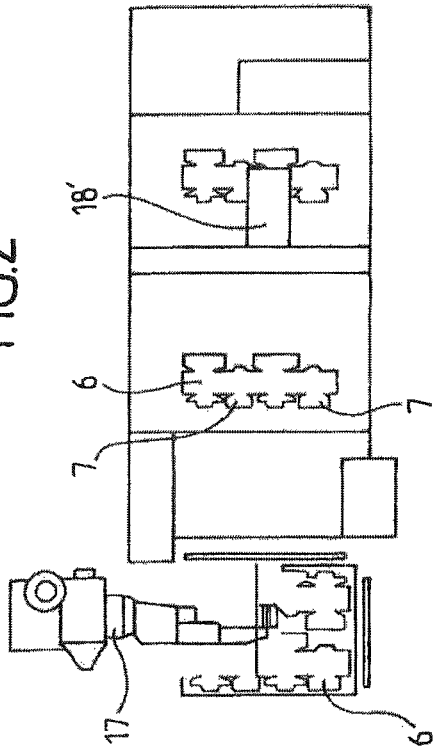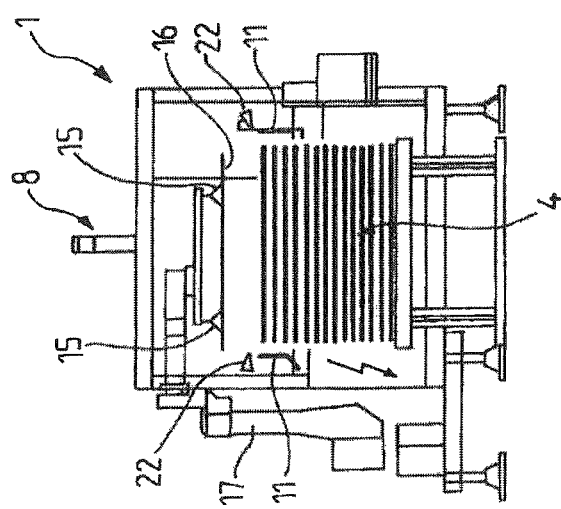
FIG.2
FIG.3
FIG.1

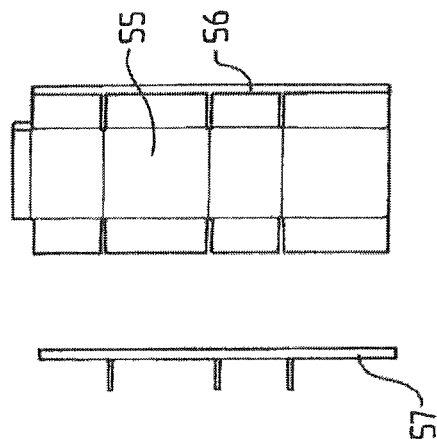
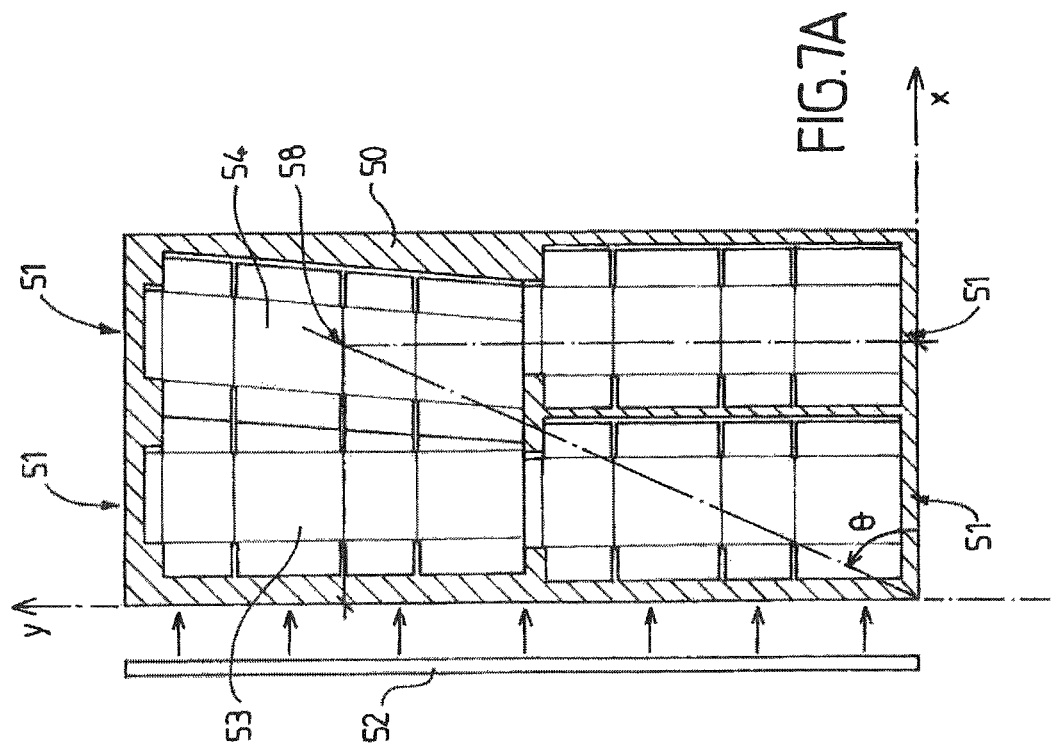

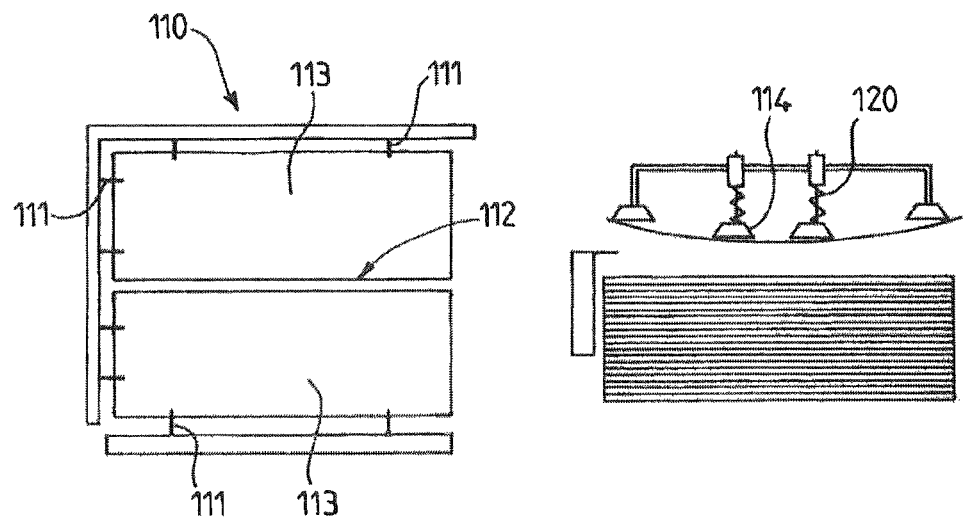
ART ANTERIEUR  FIG.13
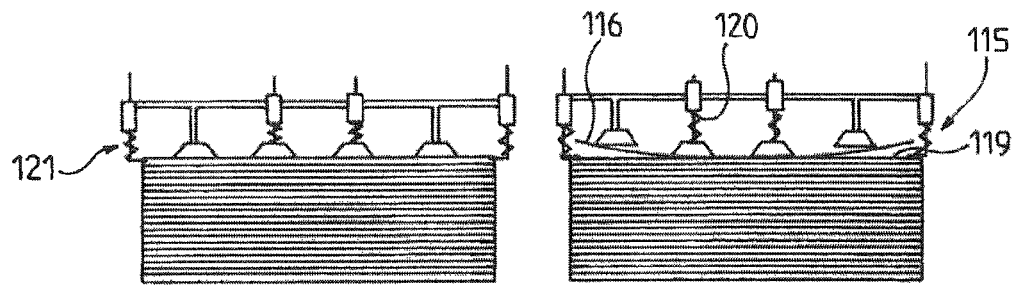
FIG.14
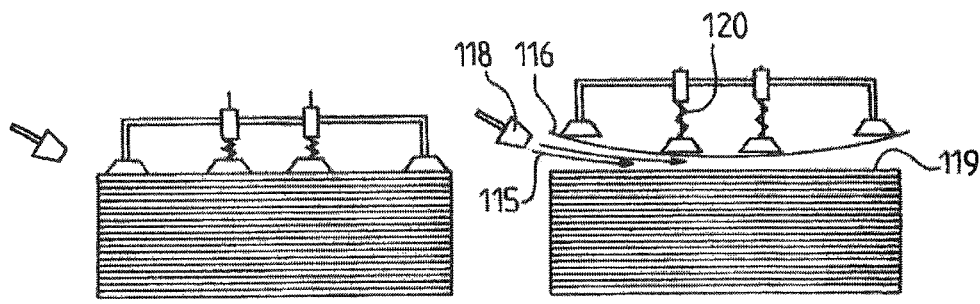
FIG.15

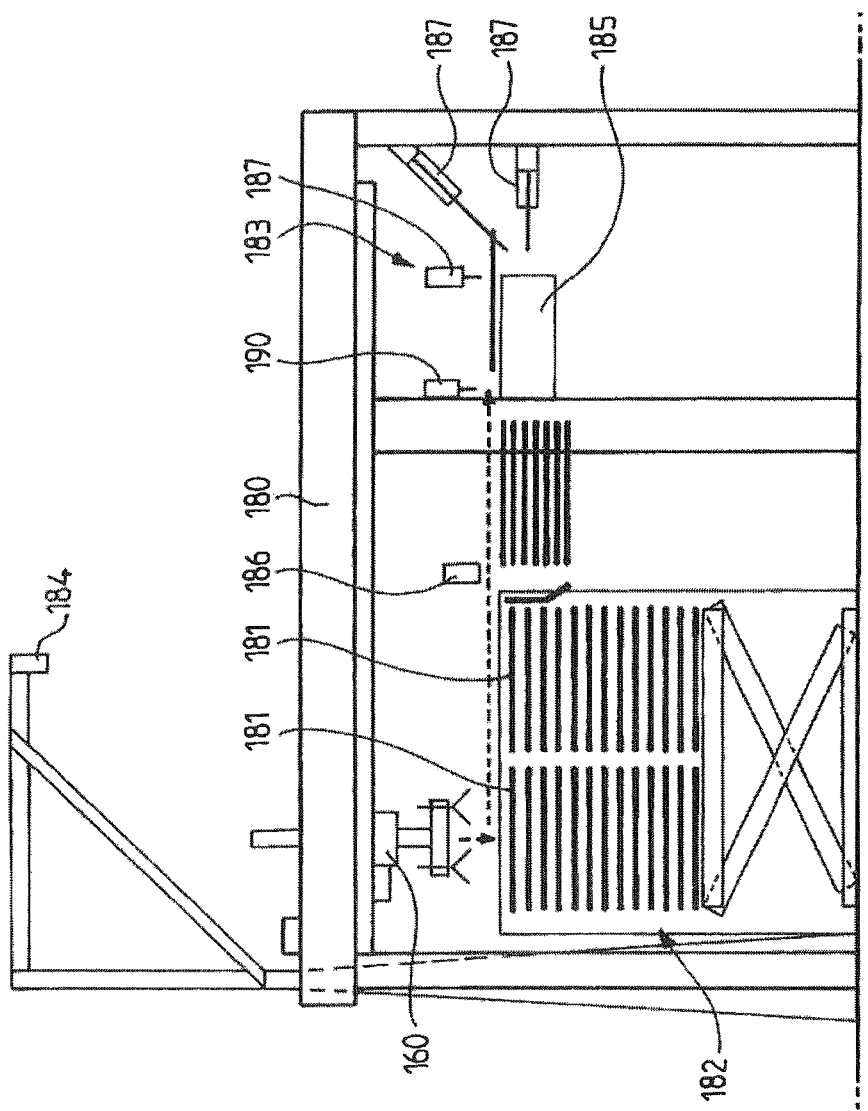

METHOD AND DEVICE FOR TRANSFERRING CUTOUTS FOR PACKAGING BOXES

The present invention relates to a method for transferring cutouts, for packaging boxes with a polygonal cross section, from a magazine formed from at least one stack of cutouts made of sheets of carboard or corrugated cardboard material including notches.

It also relates to a device for realizing such a transfer in order to produce the box.

Numerous methods for forming cases in corrugated cardboard are already known.

They generally comprise the following steps:
After the cardboard blank has been picked up by suction cup from an inclined vertical magazine, the blank or cutout is glued, then it is put on the volume before closing, by drawing down, the sections forming the base and/or the walls of the box made up in such a manner.

Such methods require the magazine to be filled in a regular manner.

To to this, the loading mode most widely used requires the manual intervention of operators in regard to the pallets on which the cutouts are stacked.

Said repetitive manual loading, however, proves very troublesome in the long term, above all when the frequency of changing the magazines is increased and when the weight and/or the dimensions of the cutouts are large.

By way of example, a machine operating at a rate of thirty cases a minute to form packages of three hundred grams, requires the handling of about four tons of cardboard per day (over eight hours).

This type of handling causes health problems for the operators who, as a result, experience musco-skeletal disorders.

Solutions have therefore been researched allowing the magazines to be loaded in an automatic manner, without an operator having to lift the loads of cardboard.

Gripping systems are thus known which are capable of simultaneously lifting and displacing several cardboard sheets in packets, which makes it possible to transfer an entire stack of cardboard from a pallet to the magazine.

The difficulty of implementing such systems in this case lies in the gripping of the stack.

The pick-up from a stack which is effected by lateral pincers is in fact difficult to realize in a precise, repetitious manner.

Needles inserted between two cardboard sheets from one side of the stack to be moved are used customarily. The needle raises the stack slightly at an angle at the side and therefore allows one or several fine sheets or blades to be introduced under the stack to be lifted. With such systems, however, the gripping of a precise number of sheets is not guaranteed.

Also known is a device which consists of means allowing a packet of cutouts to be displaced laterally on a stack so as to make it emerge from the stack then to lift, by way of a blade, the part of the packet which protrudes by then introducing a plate underneath it in order to displace the load.

In effect, known means enabling operators to avoid tiredness essentially consist in treating the cutouts in stacks or in packets by displacing a large number of cutouts at once.

However, such a solution has disadvantages.

A first, major disadvantage is in restricting the possibility for gripping the cutouts with very simple palletizing planes, notably generally two stacks of cardboard aligned in one row.

In fact, so that the cutouts can be picked up by the pincers, it is necessary for two opposite edges thereof to be accessible.

The devices of the prior art do not permit the unstacking of pallets consisting of several rows of cutouts, each row itself consisting of several stacks.

Now, these types of pallets, which enable transport costs to be optimized, are used more and more often.

These types of devices are no longer suitable if the shapes of the cutouts allow them to be interleaved on the pallets.

Another disadvantage lies in the impossibility of reaching cutouts located right at the bottom of the pallet, impossible to extract automatically. They are therefore often lost, which generates a large amount of waste.

Finally, if the pallets have been shaken during the handling which preceeds their positioning in the unstacking zone, the cutouts of a same pallet will be moved and will often be interleaved together.

This phenomenon therefore make unstacking difficult and generates machine stoppages with human intervention to re-organize the cutouts on the pallet preventing real automation of the process.

The present invention aims to alleviate these disadvantages, by proposing a method and a device responding better than those known previously to the requirements in practice, notably by enabling the depalletization of cutouts at high rates whatever the palletization plane.

The invention is used a lot particularly, although not exclusively, in the area of the forming of boxes from low grammage ($<120\,g/m^2$) corrugated cardboard cutouts or sheets for industry or food-processing.

With the invention, it is going to be possible to carry out the unstacking automatically even if the cutouts have been displaced laterally, have pivoted, have been interleaved or are overlapped.

By proposing that each cutout is picked up as a unit, it also allows for an optional placing on a volume after the gluing of said cutout by the same tool, the inscription of a bar code by fixing and/or the fixing of an RFID chip or any other means of lining-up, being able to be carried out also at the same time and within the continuity or the movement.

It also allows all the cutouts of the pallets to be accessed without losing the last cutouts.

To do this, the invention proceeds notably from the idea of no longer displacing the packets of cardboard towards a generally inclined feed magazine, but to process the cutouts one by one after having located and repositioned them perfectly in space during the movement.

With this aim, the present invention essentially proposes a method for transferring cutouts, for producing packaging boxes with a polygonal cross section, from a magazine formed from at least one stack of cutouts made of sheets of cardboard or corrugated cardboard material including notches, characterized in that the stack being vertical, the cutout on the top of the stack is located by camera, said cutout is preliminarily detached from the rest of the stack, the top cut-out which has been located in this manner is grasped by means of suction, said cutout is displaced by means of a robotic arm and is released at a following station, for or prior to subsequent forming, and the above cycle of steps is repeated with the next top cutout.

With the method as claimed in the invention, it is therefore possible to realize the picking up of a cutout as a unit by means of suction, that is to say by means of suction cups, from a pallet consisting of several stacks and/or several rows with or without interleaving of the cutouts.

The rate of handling the cutouts, moreover, is multiplied by a factor of 10 to 50 compared to a handling of packets, and this is in spite of the difficulty of the high speed displacement in space of cardboard sheets which behave as deformable wings.

The rapid lifting of a cardboard sheet from a stack has moreover never been researched in the prior art as it generates a suction phemomenen between the lifted sheet and the sheets located underneath.

This results in several of the sheets located under the lifted sheet changing their position laterally and rotationally in a totally random manner at each pick-up.

They can, therefore, overlap the cutouts of the adjacent stack and the expert would have found it too difficult to line them up in space and to reposition them with certainty at a point off course.

By preliminarily detaching the cutouts and locating them precisely by camera, this disadvantage is alleviated.

In advantageous embodiments, use is also made of one and/or the other of the following arrangements:

said cutout is glued prior to the following station which is a forming station;

the method consists of more than thirty cycles per minute;

the magazine consists of several rows and/or several stacks of cutouts, the cutout on the top being picked up from said rows or stacks;

several robotic arms are used operating alternately;

the magazine of cutouts being formed by a pallet, the pallet is placed on a lifting device, the top of the pallet is raised as far as up to an observation and pick-up plane, the top cutout is detected, and said cutout is grasped by suction in order to be taken to the following station;

the cutout on the top is detected by way of at least one digital camera which is located above the magazine and is centered with respect to the said magazine, the cutouts on the top are filmed, and the data obtained in this manner is transmitted to a computer in order to determine the cutout on the top;

the cutouts on the top are illuminated in an angled manner in order to generate shadows produced by the notches and the overlaps between cutouts and the cutouts which do not have all their shadow zones as they have been underneath are moved away;

the sharpest cutout in the pick-up plane is determined in order to locate the cutout on the top;

from the dimensions of the cutouts to be located in the pick-up plane and from the image obtained by the camera or cameras, the presence of four or more shadow zones and the distance between said zones is computed, the barycenter and the angle of the cutout in relation to a referenace position are computed, the result of said computations is communicated to the robotic arm which is provided with suction tooling and said robot is displaced in order to align said suction tooling with the lining-up of the cutout before grasping it by suction by way of said tooling;

to carry out the preliminary detachment and to grasp the cutout on the top by suction, suction cups are positioned at different points on the cutout, then lifting is begun at one or several sides of the cutout, whilst part of the cutout is blocked, in order to create at least one lateral air inlet;

the forming is effected by punching action in a cavity;

the box is formed at the forming station by rolling the cutouts around a determined volume;

the cutout on the top is taken to the forming station by suction cups displaced along the horizontal axis by the robotic arm at a speed of translation of between 4 m/s and 6 m/s inclusive;

the cutout is transferred to the forming station by an element with two carriages on which the robotic arm is mounted, said element being actuated by a drive system including a belt and pulley arrangement with electric motors;

the box la formed from a cutout consisting of a series of at least four principle sections terminated by a fastening tab, said sections being connected together by the first folding lines parallel with one another, said series of sections forming the outer walls of the box and being connected on one side to a series of flaps by the second folding lines perpendicular to said first folding lines, to form the base of the box;

the box is formed from a cutout consisting of a central panel and four lateral peripheral flaps;

the method consists of a lining-up step after beingg taken-up by the robot and prior to being deposited at the following station.

The invention also proposes a device implementing the method such as described above.

The invention also relates to a device for producing packaging boxes with a polygonal cross section from a magazine formed from at least one stack of cutouts made from sheets of cardboard or corrugated cardboard material including notches, characterized in that the stack being vertical, said device consists of means for locating the cutout on the top of the stack by camera, means for detaching said cutout in relation to the rest of the stack, means for grasping said cutout by suction including a set of at least four suction cups, and a robotic arm for displacing said cutout laterally to a following station, with regard to the forming thereof, before returning unloaded in order to grasp the next cutout on the top.

In advantageous embodiments, use is also made of one and/or the other of the following arrangements:

said device also consists of means for gluing said cutout prior to the following station;

the magazine consists of several rows and/or several stacks of cutouts, the cutout on the top beign grasped from said rows or stacks;

said device consists of several robotic arms operating alternately;

the magazine or cutouts being formed by a palett, the device consists of a lifting platform for lifting the pallet as far as up to an observation and pick-up plane, and means for the visual detection of said observation plane;

the device includes at least one digital camera located above the magazine and centered in relation to said magazine, means for storing and transmitting digital images obtained in this manner to a computer and means for computing the data obtained in this maner in order to determine the cutout on the top;

said device consists of means for illuminating the cutouts on the top in an angled manner in order to generate shadows produced by the notches and/or the overlaps between cutouts and means for selecting the relevant cutout, said means being arranged in order to move away the cutouts which do not have all their shadow zones as they were underneath. The term illuminating in an angled manner refers to horizontally or at an angle in relation to the plane of the cutout less than 30°, for example 15°;

said device consists of means for selecting the sharpest cutout in the pick-up plane in order to locate the cutout on the top;

the device includes means for storing the dimensions of the cutouts to be located in the pick-up plane and the image obtained by the camera or cameras, means for computing the presence of four or more shadow zones and the distance between said zones, means for computing the barycenter and the angle of the cutout in relation to a reference position, means for transmitting the result of said computations to the robotic arm provided with suction tooling and means for aligning said suction tooling with the lining-up of the cutout prior to it being grasped by suction by way of said tooling;

the means for detaching the cutout on the top include elements which are arranged to lift one or several sides of the cutout whilst blocking part of the cutout, in order to create at least one lateral air inlet;

the device consists of a station for forming by a punching action in a cavity;

said device consists of a station for forming by rolling the cutouts around a predetermined volume;

said device consists of an element with two carriages on which is mounted the robotic arm, said element being actuated by a drive system including a belt and pulley arrangement with electric motors.

The invention will be better understood by reading the description below of embodiments given hereafter as non-limiting examples.

It refers to the accompanying drawings in which:

FIG. 1 is a schematic representation of a front view of a device as claimed in a first embodiment of the invention.

FIG. 2 is the side view of the device of FIG. 1.

FIG. 3 is a top view of the device of FIG. 1.

FIG. 7A shows a top view of an example of the pallet with four stacks slightly out of line.

FIG. 7B illustrates the calibration of the camera which then allows the lining-up of the cutouts such as shown in FIG. 7A.

Figure 10:
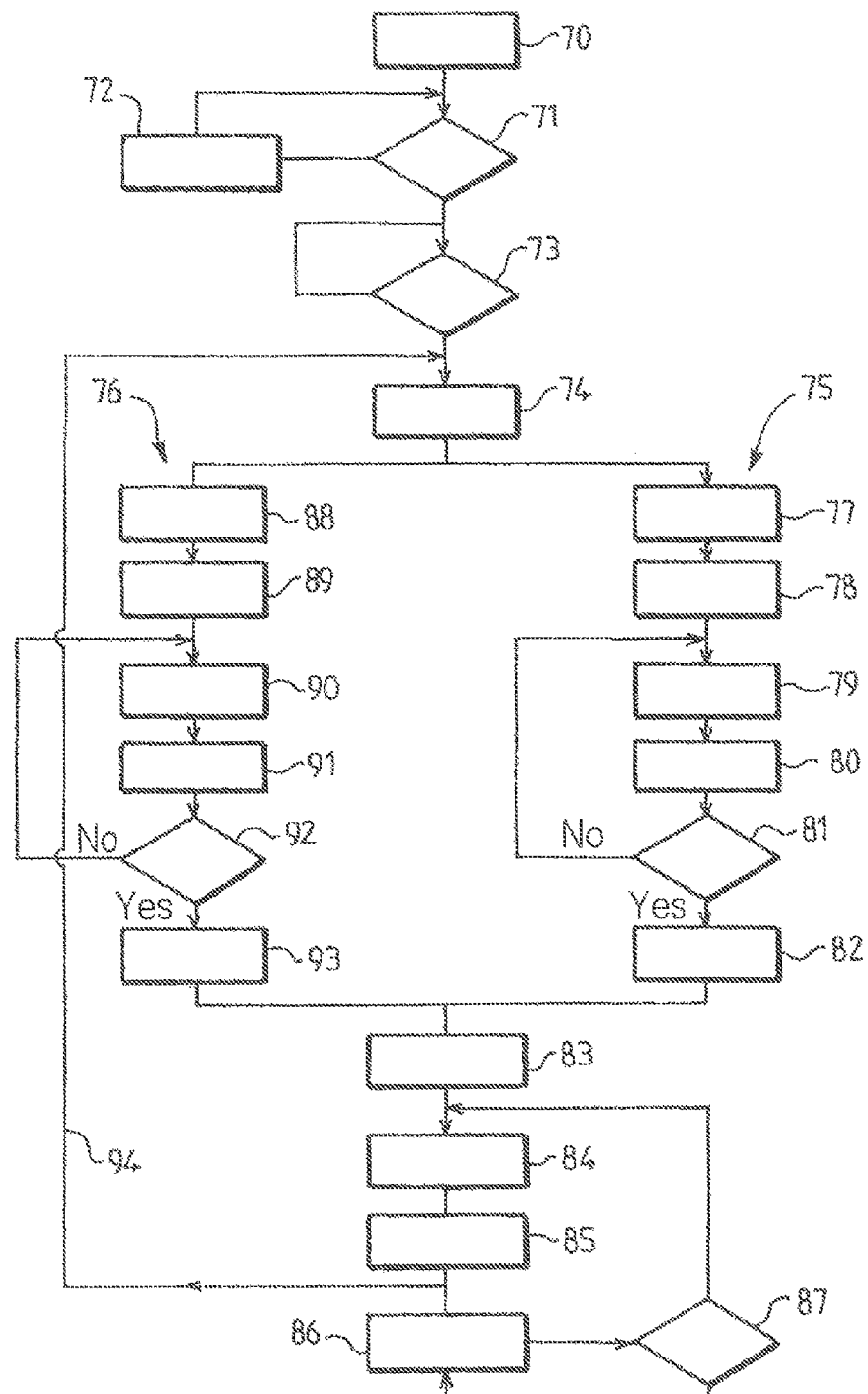

FIG. 10 provides a flow chart for the operation of an embodiment of the method as claimed in the invention.

Figure 11:
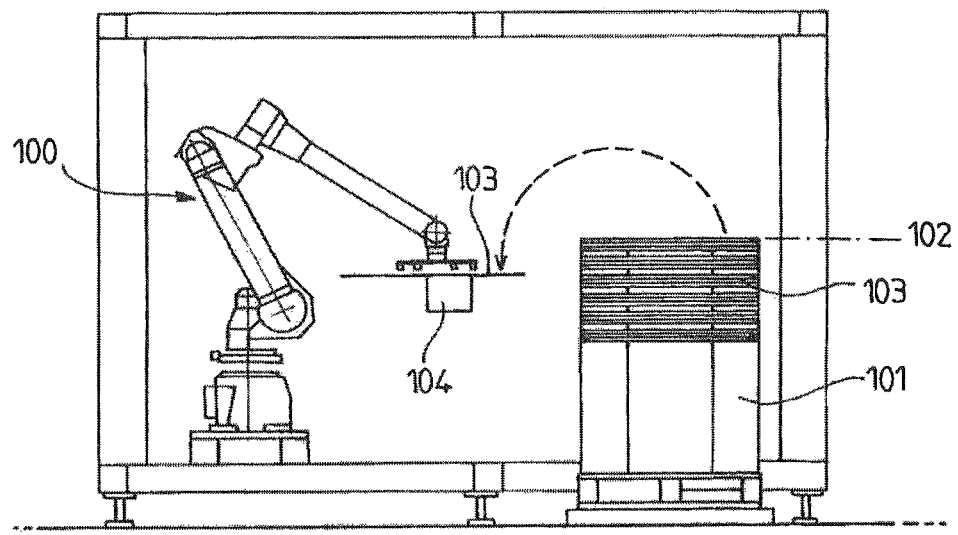
Figure 12:
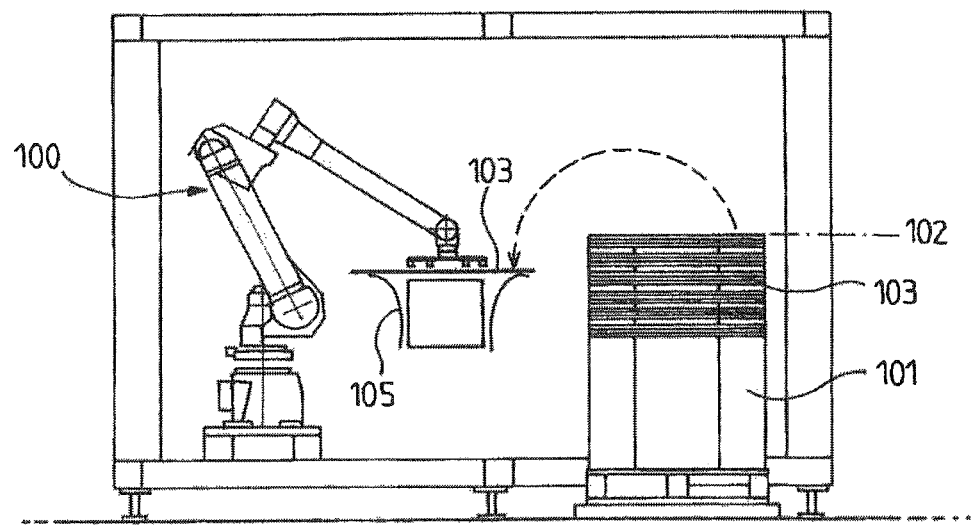

FIGS. 11 and 12 show a side view of a device as claimed in the invention applied to the forming around a mandrel (FIG. 11) and by piston action in a cavity (FIG. 12).

FIGS. 13 to 16 show embodiments for the preliminary detachment of the grasped cutout prior to suction.

Figure 17:
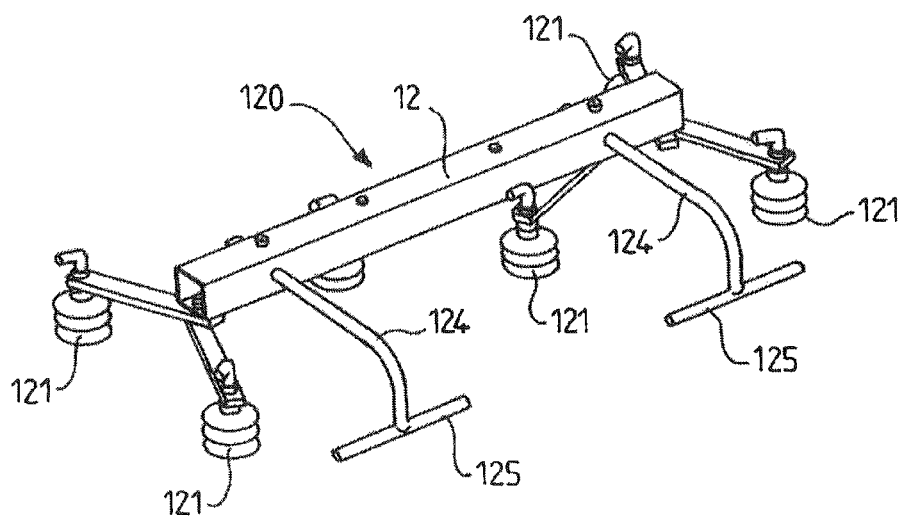

FIG. 17 is an embodiment of suction tooling usable with the invention with means for the preliminary detachment.

FIGS. 18 to 21 show other embodiments for the preliminary detachment of the cutout prior to being grasped by suction.

Figure 22:
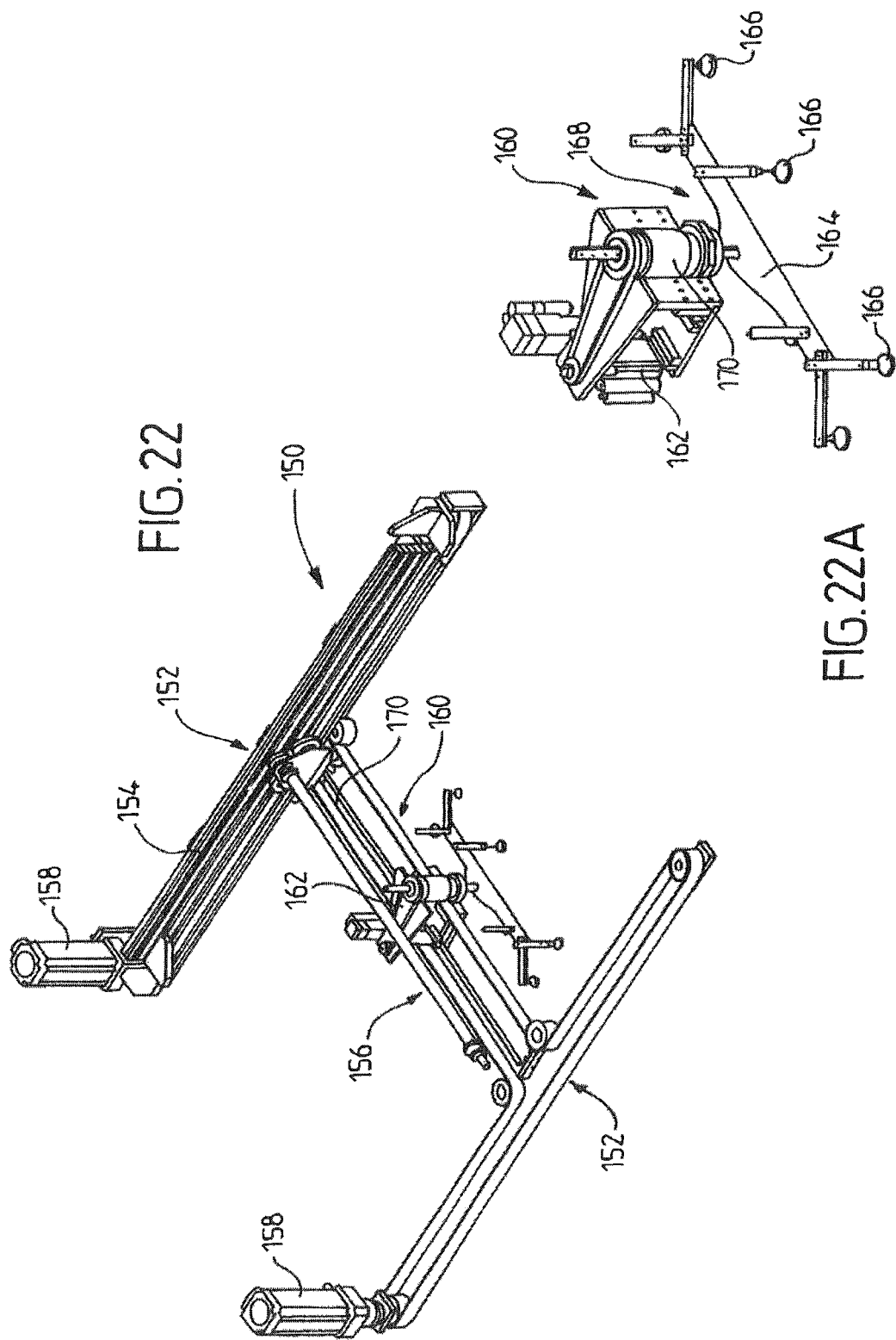

FIGS. 22 and 22a show another embodiment of a robot and/or robotic arm usable with a device as claimed in the invention.

Figure 23:
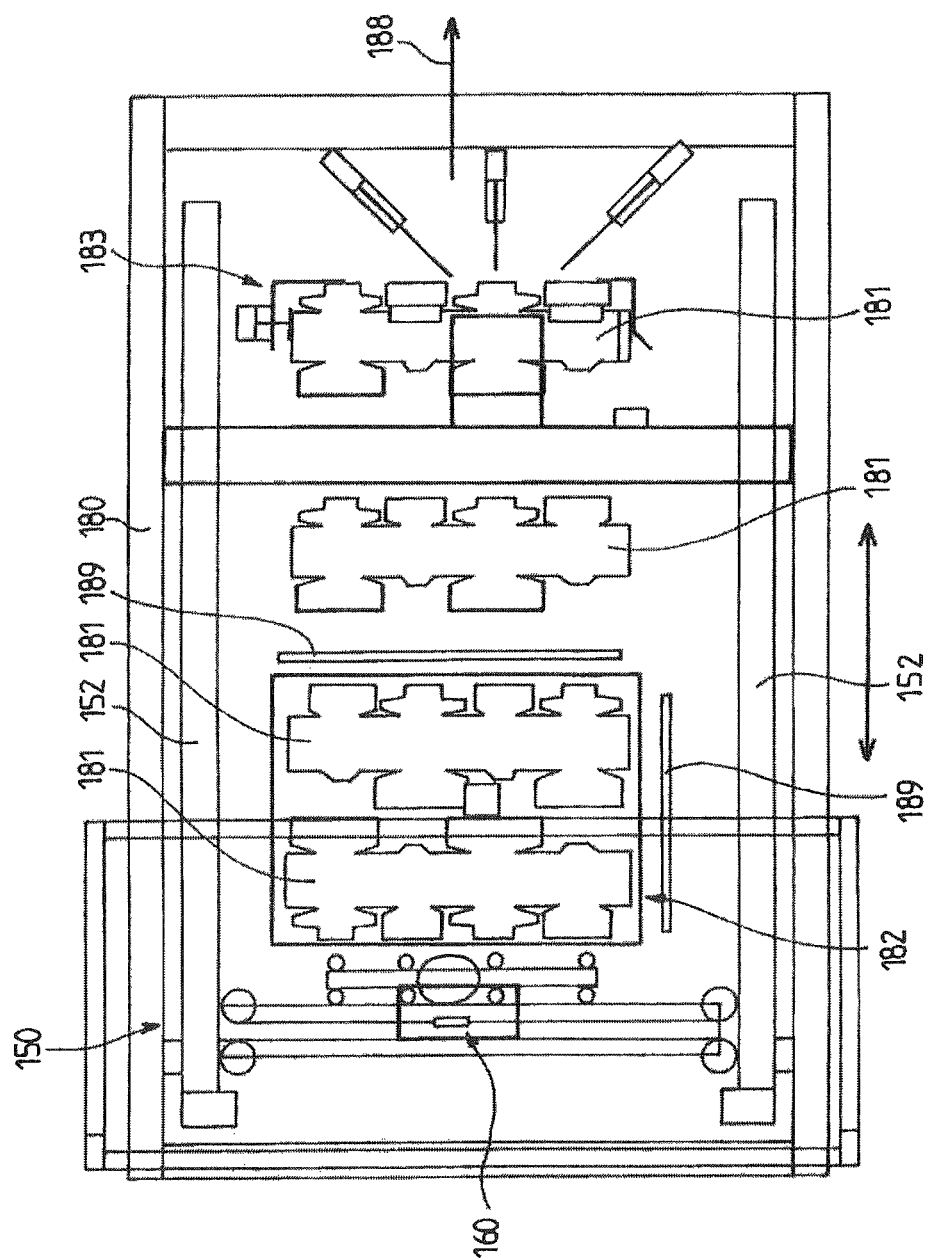

FIG. 23 is a top view of a device as claimed in the invention using a robot of the type described with reference to FIG. 22.

FIG. 24 is a schematic side view of the device of FIG. 23.

During the description, wherever possible, the same reference numbers will be used to designate identical elements.

FIGS. 1 to 3 show a device 1 for producing a box 2 from a magazine 3 formed from two stacks 4 and 5 of cutouts 6 made of sheet cardboard or corrugated cardboard material including notches 7.

The stacks are vertical. The device 1 consists of means 8 for locating the top 9 of the stack by camera 10, means, which will be explained in more detail below, for detaching or preliminarily detaching 11 the cutout on the top 12 of the stack, for example the first stack 5.

The device as claimed in the invention also includes means 14 for suction including, for example, four or six suction cups 15 for grasping the cutout 16.

The device 1 also includes a robotic arm 17 for the lateral displacement of the suctioned and grasped cutout to a following station 17' with regard to the forming thereof, for example, to the next station at 18.

The device also consists of means for gluing (not shown) the cutout prior to the forming station 18, for example around a mandrel 18'.

More precisely, the cutout magazine 3 is formed by a pallet 19, which is, for example, the pallet which has been used for transport, and consists of a lifting platform 20 of the type known per se, which allows the pallet to be raised as far as up to an observation and pick-up plane 21 (chain-dotted line in the figure). Means for the mechanical or visual detection (not shown) of said observation plane of the cutout on the top, for example by means of an end position, and/or by means of an infrared beam, allow the precise location to be obtained.

As claimed in the embodiment of the invention more particularly described here, means 22 for illuminating at an angle are provided and will be able to be used so as to determine which is the cutout on the top. They will be described further below.

All the elements of the device are mounted around a frame 23 in a known manner per se.

Means for automatically supplying (not shown) the suction cups and putting them under negative pressure, moreover, are of course provided in a known manner per se.

Figure 4:
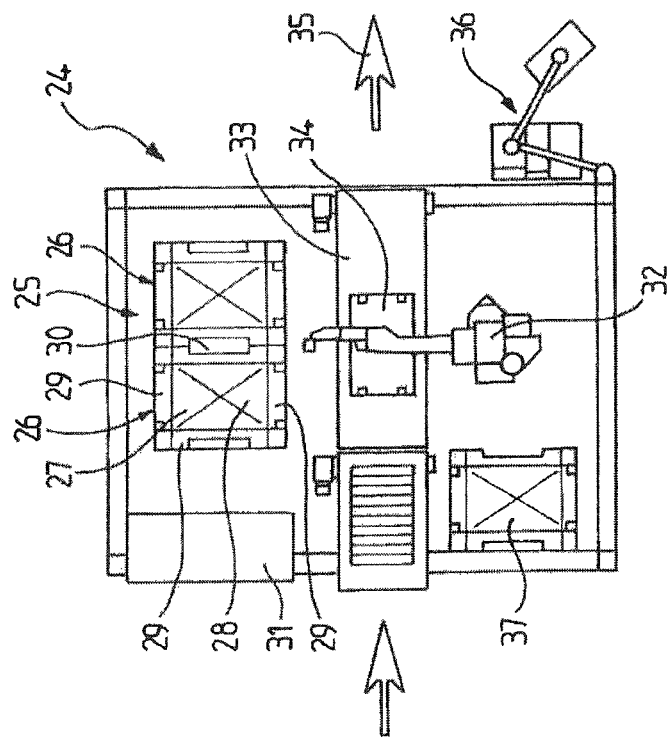
FIG. 4 is a top view of another embodiment of the device as claimed in the invention.

FIG. 4 shows a top view of another embodiment 24 of a device as claimed in the invention. In this case, the pallet magazine 25 consists of two stacks 26 of rectangular cutouts 27 formed by a base 28 and four lateral sections 29 with notches 30.

The control box 31 enables the assembly to be supplied with electricity and consists of the means for computing (computer, PC, etc.) known per se which, once they have been correctly programmed, will be used to carry out the cycles looked at. The robotic arm 32 is arranged to extend above the magazine 25 and then to place the cutout 34 in position on a conveyor belt 33, of the type known, so that it is then guided and picked-up again (arrow 35) for subsequent forming.

Gluing means 36, which can be displaced laterally, then come and deposit lines of glue on the packaging moving forward on the conveyor belt 33.

A wad stock 37 of cutouts, which are usable when the pallet magazine 25 has to be changed, can be provided, for example, in such a manner that there is no loss in rate.

The robotic arm 17 or 32 is, for example, a commercial robot of the type used in the automobile industry which enables displacements along four intelligent axes.

It is capable of positioning the cutout 34 in relation to the coordinates supplied by the software, the operation of which will be described more precisely with reference to FIG. 10.

To do this, the robotic arm takes the cutout from the pick-up plane, located thanks to the pick-up plane detector at a same height±50 mm, lifts it up, moves it and puts it down in the transfer channel, on the conveyor belt or so as to make up another stack.

This latter case enables the "classic" magazine of an existing machine for forming packaging to be supplied.

In the event of wishing to increase the rate, the device can be equipped with several robot arms operating alternately and complementing one another.

As claimed in the invention, therefore, an observation camera 10 connected to a computer is used.

Said camera gives the robot the position and the angle of the cutout in relation to a line-up which is common to the robot and the cutout.

In one advantageous embodiment of the invention, in order to give any disturbances a good level of accuracy and luminous insensitivity, an angled lighting system is provided illuminating the observation zone.

Said lighting system 22 is oriented in an advantageous manner in order to light up the cutouts at an angle in relation to the pick-up plane 21 of between 5 and 25° inclusive, for example 8°.

Such lighting thus creates shadows which are going to generate contrasts enabling the position of the cutout in relation to the rest of the stack to be assessed without any risk of error.

Figure 5:
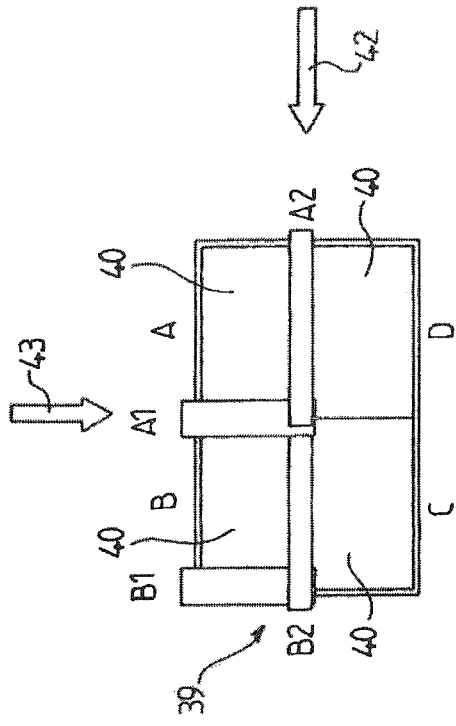
FIG. 5 is a schematic representation of a top view showing the lining-up method by camera.

FIG. 5 shows a top view of an example of parameterization of a pallet 39 with four stacks 40 of cutouts in four incrementable zones, each zone corresponding to a stack A, B, C or D with D+1=A.

In said incrementable zones, sub-zones will be defined corresponding to the expected edge of the cutouts, namely zone 1 which is going to be A1 for A, B1 for B, etc., and zone 2 which is going to be perpendicular to zone 1, namely A2 for A, B2 for B, etc.

To create the shadow zones in said zones A1, A2, imposed side lighting following X (arrow 42) or following Y (arrow 43) is then used.

The lighting is either fixed lighting (neon or constant luminous sources), or pulsed lighting (flash-type, very short term luminous impulse).

Finally and prior to start-up, a rest point is determined in advance, that is to say the point where the robot must free the zone of vision. This will be the reference passage point for the movements locating the cutout.

The robot 17 or 32 includes tooling for gripping the cutout on the pick-up plane, said tooling being provided with suction cups.

It also includes a computer which is arranged to compute a trajectory which is going both to enable a cutout, one single cutout, to be taken whilst minimizing the movements of the other cutouts on the pick-up plane, then to be brought to the surface on which it is to be placed, that is to say, as has been seem, either on a channel or in a magazine, or directly on a forming mandrel or in a cavity.

Figure 6:
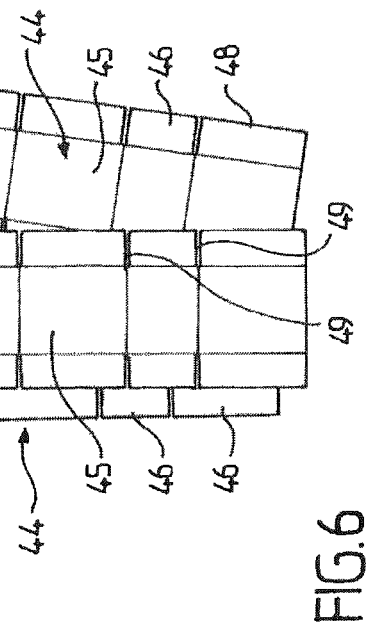
FIG. 6 is a top view of a example of the cutouts in a jumble and out of line, capable of being grasped thanks to the method as claimed in the invention.

FIG. 6 shows a top view of what can be the disordered positions of the cutouts 44, constituted by section belts 45 including flaps 46 on both sides, and terminated by a gluing tab 47 in a known manner per se, on a pick-up plane such as shown with the invention.

The angled lighting 42, 43 in FIG. 5 enable shadows to be generated here at the contours 48 and the notches 49 of said cutouts which are going to be used.

In this respect and in a advantageous manner, the observation zone can be hooded (in a manner not shown) to avoid outside light disturbances which would prevent perfect recognition or identification of the cutout in comparison with the standard recorded image, as described with reference to FIGS. 7A and 7B.

FIG. 7A, in this case, shows an example of a pallet 50 with four stacks 51 of cutouts of the type described with reference to FIG. 6, the lighting (ramp 52) being, for example, in this case, pulsed-type lighting driven by image analysis software in a manner knowm per se.

This allows the light (neon or LEDS) only to be activated whilst images are being taken, the impulse varying typically and for example from 1 to 150 images per second.

As for the lamps, they are typically positioned at a spacing of between 5 and 20 cm in relation to the observation plane at an angle of incidence of between 5 and 30° inclusive.

In the example of FIG. 7A, the cutout 53, hidden in part by the cutout 54, is going to provide the coordinates workable for B, then C, then D (cf. FIG. 5) but not A.

It is only if A is uncovered, by the withdrawal of B, that the system will take A.

An exact identification of the coordinates of a reference cutout has been established in advance in relation to a standard image pre-recorded thanks to the exact positioning of a control cutout 55 (FIG. 7B) on the pick-up plane allowing the shadows 56 generated by the lighting 57 to be removed in a manner known per se within the framework or the robot training.

The barycenter and the angle of rotation of the cutout is found by creating shadow zones.

The computational speed to find the position (x, y) and the angle (θ) of the barycenter 58 (see FIG. 7A) of the cutout 54 located on the top is attributed to the tools and the software used, the design of said software being accessible to the expert.

There will be a maximum determined time for locating a given cutout, with a repeatability of its positioning of less than 1 mm. For two cutouts the time will be less than the time of one cutout multiplied by two, etc.

If the time of locating one cutout departs from the control tolerance, it is considered as non-compliant.

The overlapping between the cutouts will therefore be treated according to this principle. Thus, the cutout 53 in FIG. 7A is not compliant as it does not have all its shadow zones and therefore cannot be computed within the time determined. It is therefore underneath. In the case of cutouts where the stacks have become entangled and/or of cutouts which have been displaced as a result of the picking up of other cutouts, said principle enables the cutout, which is to be taken from the top of the others, to be detected.

The zones A, B, C and D are therefore inspected as each image is taken.

As long as there is no covering, the counters are incremented 1 to 1.

If the following cutout is covered, the one which follows is taken (if it is compliant) and so on.

Another method, usable with the method as claimed in the invention consists in determining the sharpest cutout corresponding to the standard (cf. FIG. 7B).

The more complicated the dimension algorithm, the greater the computational power has to be to process the image. With complicated palletization planes, lighting systems, which are desynchronized in relation to one another so as to enable sufficient processing, are, for example, also provided.

Figure 8:
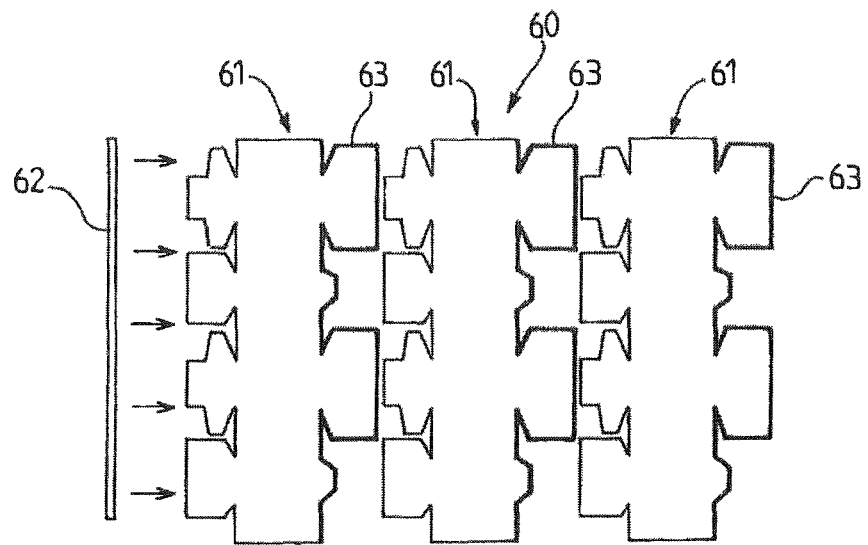
FIGS. 8 and 9 illustrate the shadow zones on cutouts with lateral illumination, usable with the camera and the computer software as claimed in the invention.
Figure 9:
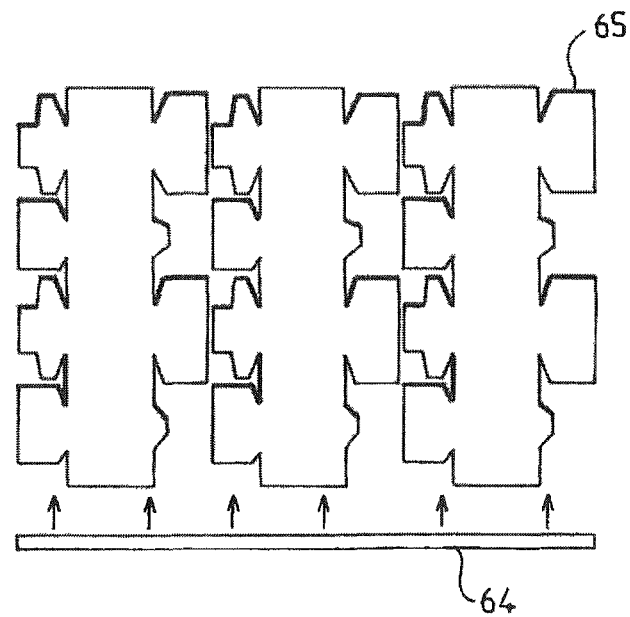

FIGS. 8 and 9 show an example of a pallet 60 with three stacks 61, with lateral lighting 62, 64 generating shadows 63, 65 (bold lines on FIGS. 8 and 9).

The software therefore manages the two lighting systems simultaneously and compares the images taken by the camera at two angles to two corresponding reference images.

In simple cases, in contrast, it is possible to be limited to one lighting system and to one reference image, as described below.

In a known manner per se, the robot is programmed to guide the operators in the creation of new formats.

Once this is done, the robot moves to production mode corresponding to the format selected (standard registered format).

For the training of a format, the dimensions of the cutouts to be located on a palletizing plane are carried out.

From the image received, the software computes the presence of the four (or more) shadow zones retained and the distance between said zones.

It then computes the coordinates of the barycenter (x, y) and of the angle ($\theta$) of the cutout, and communicates the line-up of this latter to the robot.

The robot is then displaced in order to align its tooling with the line-up of the cutout, then in order to take up the cutout, its trajectory, therefore, being perfectly defined.

A flow chart of the method as claimed in the embodiment of the invention will now be described with reference to FIG. 10, more particularly envisaged with four stacks of cutouts A, B, C, D (cf. FIG. 5).

The robot is first of all initialized (box 70), the pallet in position, the zone being, for example, the observation zone D.

The robot is then tested in 71 to find out if it is at the rest point. If not, it is taken there in 72.

The operator then asks in 73 if a cycle is to be carried out.

If yes, the program starts according to the application selected in 74, as much for the rate level as for the number of stacks.

There, two embodiments, for example, are envisageable, namely that using pulsed lighting (column 75), or that using imposed but normal lighting (column 76).

More precisely, in the case of pulsed lighting, this is started in 77 (asynchronous pulsed lighting according to x, y).

Therefore, the pallet is lit up (box 78) according to X and an image L is taken, the pallet is then lit up according to Y and an image M is taken.

The zone is incremented in 79 (D→A→B→C), i.e. zone=zone+1.

In 80, the image L is analyzed as an image percentage in relation to the reference image of zone 1, then the image M as an image percentage in relation to the reference image of zone 2.

If (test 81) the images L and M are aligned with the two reference images, the barycenter is therefore computed (step 82) and the robot is oriented in X, Y and theta.

The coordinates X, Y, theta are communicated to the robot which is displaced to the points X, Y, $\theta$ situated above the cutout, that is to say with a vertical coordinate in Z above the pick-up axis Z (box 84).

The suction cups are lowered to the pick-up point, the cutout is then grasped and detached vertically in order to enable its movement in X, Y, theta, before moving it effectively to the point of rest (step 85).

The cutout is deposited at the point of use and the robot returns to the point of rest (step 86).

The set of steps 84 to 86 is then repeated with the next cutout (request for a complementary cycle in 87).

The other embodiment of the operation of the method described with reference to FIG. 10 is with imposed lighting.

Once the imposed but normal lighting of the pallet has been started in 88, an image is taken by the camera in 89.

The zone is then incremented, from zone to zone+1 (step 90), the image L is analyzed (step 91) as a percentage of the reference image in relation to zone 1 and zone 2.

If the image L is equal to the reference image (test 92), it is analyzed then its barycenter and its orientation in X, Y, theta is computed (step 93), before returning to the method described beforehand in 83.

As indicated above (path 94) and after step 85 moving down to the pick-up point, the analysis and the computations concerning the following cutout are initiated by returning to step 74, according to the programmed applications for the rate and the number of stacks.

FIGS. 11 and 12 shows two embodiments of the device as claimed in the invention, particularly efficient and enabling the packagings to be formed in a rapid manner.

In effect, in this case, it is a question of directly unloading, by means of the robotic arm 100, the cutouts 103 from the raised pallet 101 (chain dot line 102), by putting said cutout, directly after gluing (not shown), on a forming mandrel 104 (FIG. 11) or in a cavity 105 for piston action (FIG. 12) for forming the box in a direct and extremely efficient manner. There is therefore no intermediate magazine used.

In the embodiment in FIG. 11 in particular, said cutout is being wrapped around a mandrel, the gripping head being provided as an option with a device (not shown) for folding the sections of the cutout around the mandrel.

Certain sections can also be folded and compressed by complementary cylinder-type or actuator-type devices motorized in a manner known per se.

Different types of tooling for the gripping head with means for detaching the first cutout as claimed in the invention are now described more precisely with reference to FIGS. 13 to 21.

As indicated previously, when a cutout is picked-up vertically at high speed, the cutout underneath is sucked up, which involves movements and complications which, up to now, have always lead the expert to avoid the type of solution as claimed in the invention.

The unstacking frame that is found in classic packaging machines always operates in fact with a magazine in the stacks are framed laterally by guides, which avoids the problem. So as to prevent the extraction of two cutouts simultaneously, these latter are held by lateral or vertical dogs. To extract one cutout from said dogs, use is made of the slight flexion of the cutout at the moment when it is pulled on, the crowning making the cutout come out of the dogs naturally.

This type of system is shown on part 110 of FIG. 13. It makes it possible to see how difficult it is to practice this type of gripping 111 on several stacks, inasmuch as at least one or two peripheries 112 of the cutouts 113 cannot be reached.

As claimed in one embodiment of the invention which is more particularly advantageous, destacking occurs without making the stack of cardboard disorderly by proceeding in the following manner.

The suction cups 114 are positioned on the cutout at different points and lifting is begun on one or several sides of the cutout whilst the central part of the same is blocked (cf. FIGS. 13 and 14).

In this way, air inlets 115 are created by lifting up the edges 116 of the cutouts thanks to the means 114 (suction cup 114 for example with blocking cylinder 120).

In an advantageous manner, air blower nozzles 118 are provided, which prevents the movement of the cutout from underneath 119 even more during the destacking operation as well as the cutouts located underneath that.

When the suction cups which have been bearing against the cutout are lifted up, the suction effect between two superposed cutouts is therefore considerably reduced.

In an advantageous manner, dogs 121 can also be provided (FIG. 14) but are not necessary.

Figure 16:
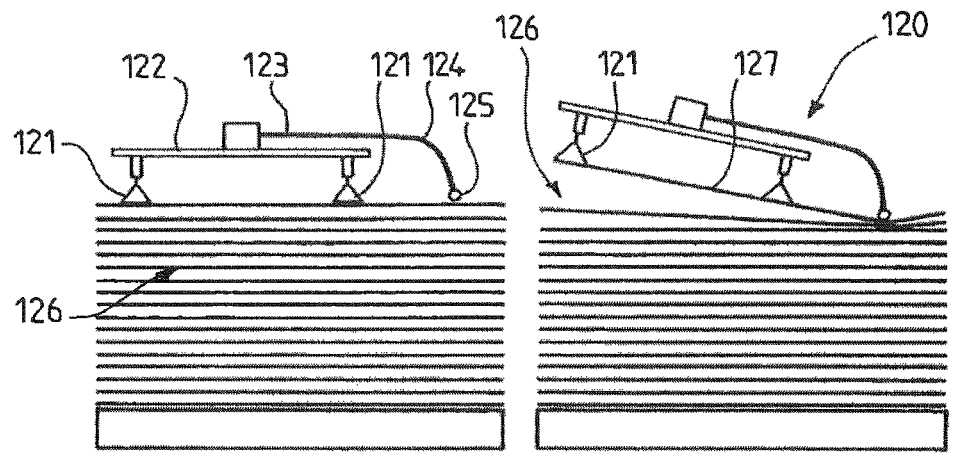

Several versions of tooling are possible such as those seen in FIGS. 16 to 17.

FIG. 16 uses a device 120 consisting of the suction cups 121 which are connected together by a vacuum feed bar 122, said bar consisting of, connected in its middle 123, a rod 124 terminated by an end 125 disposed in an offset manner in relation to the bar and its suction cups such that said rod is able to be positioned laterally above the cutouts 126.

When the suction is effected by means of the suction cups 121 on the top cutout 127, a slight lateral angular offset is effected with the suction cups and their gripping rod such that the curving rod 124 and its end point 125 come to bear against the cutout, thus freeing a space 126 which will allow the cutout to be detached without lifting up the cutout underneath.

FIG. 17 shows a perspective view of a tool 120 such as described with reference to FIG. 16.

Said tool therefore consists of the vacuum feed bar 122, four or six suction cups 121 known per se, for example arranged in a triangular manner to form the three peaks of an equilateral triangle, the curving rod 124 being, for example, a pair, and terminated by an end 125 for example constituted by a rigid bar a few centimeters in length.

FIGS. 18 to 21 show other embodiments of means or arrangements enabling the detachment of the top cutouts in relation to the one underneath.

Figure 18:
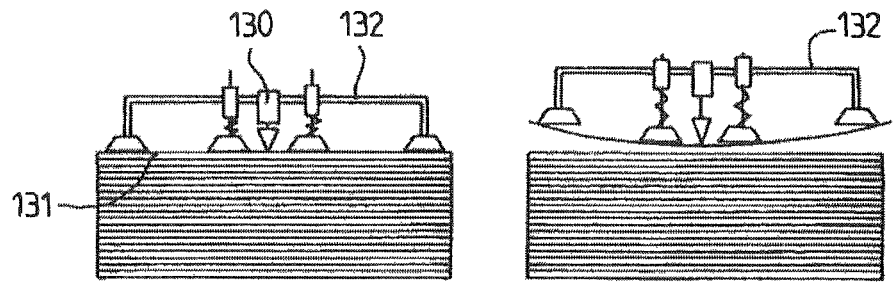

FIG. 18 shows the action of a central, vibrating cylinder 130 bearing against the cutout 131 underneath when the tooling 132 is raised, the aim being to create a vibratory shock on the cutout in order to detach the cutout underneath.

Figure 19:
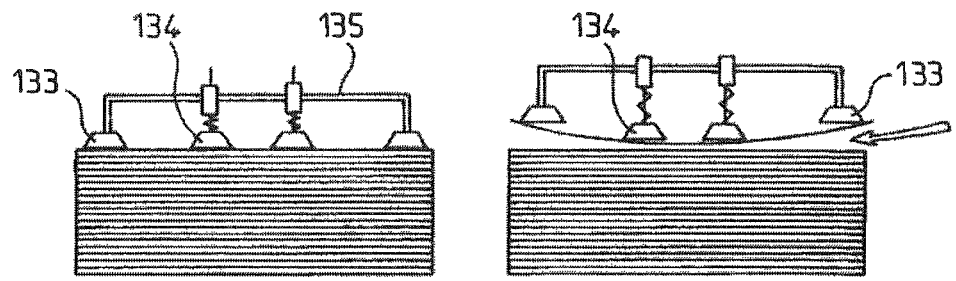

FIG. 19 shows another set of tooling as claimed in an embodiment with offset suction cups 133, 134 connected by a bar 135, in the pick-up position, which enables the friction surface between two cutouts to be reduced by means of the inlet of natural air when the tooling is raised.

Figure 20:
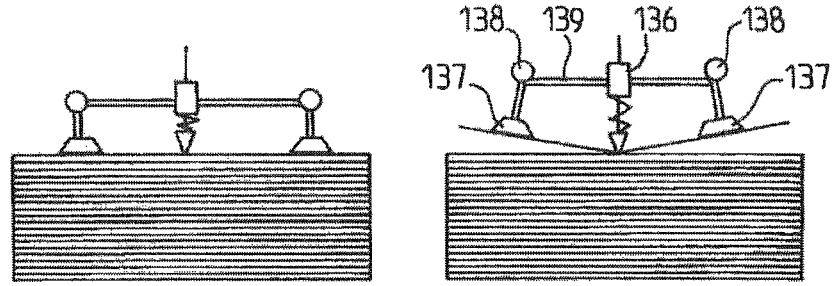

FIG. 20 is another embodiment, simpler than that of FIG. 18, with central punching, for example on a crease by way of the vibrating cylinder 136, the suction cups 137 being articulated at 138 in relation to the gripping arm 139 of the tooling.

Figure 21:
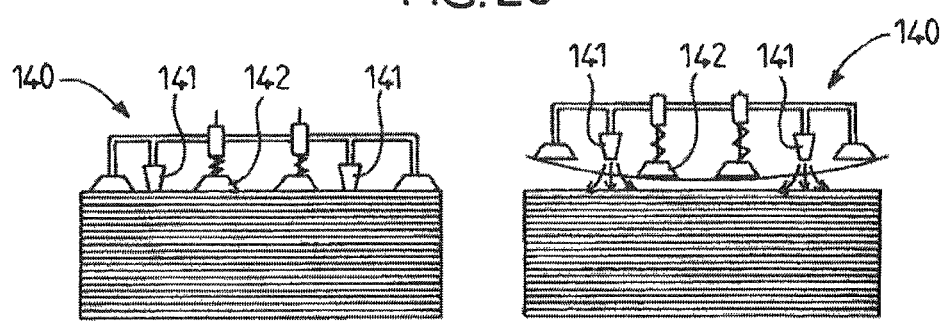

FIG. 21 also shows another embodiment of a set of tooling 140 using nozzles 141 blowing air from the top and cylinder-mounted suction cups 142.

FIGS. 22 and 22A show another embodiment of a robotic arm 150 which can be used with the invention.

Said robotic arm consusts of two legs 152 provided with transmission belts 154 enabling a central beam 156 to be displaced by way of two motors 158, thus allowing for the displacement of the central beam in the axes X, Y with respect to the horizontal.

The robot 160 itself consists of a support 162 consisting of the leg 164 for supporting the suction cups 166 in a manner known per se, the support being in fact constituted by a mobile head 168 connected to a central belt 170 for displacement along the X axis.

A motor 172 enables the vertical displacement Z.

FIGS. 23 and 24 show the use of a robot 150 such as mentioned in FIGS. 22 and 22A to form a single-part case.

FIG. 23 is a schematic representation of a top view of the device mounted on a frame 180.

The robot 160 is displaced between a portion for gripping the cutouts 181 from the vertical magazine 182 and a forming position at the station 183.

The camera 184 (cf. FIG. 24) looks at the pallet 182 and determines the cutout to be picked up in X, Y, theta.

The cutout is then picked up by the robot 160 (movement X, Y, Z and rotation follwing the external vertical axis) and it deposits the cutout on the mandrel 185.

During the transfer there is a gluing operation at 186 on the top part of the flaps of the 1 ug of the cutouts 181.

The forming of the case around the mandrel 185 is therefore carried out by beating toward the bottom of the panels of the belt notably by means of the cyinders 187.

The bottom flaps of the case are then compressed and the case is ejected in the direction 188.

When the pallet is being loaded, the robot picks up the cutout from a wad magazine (not shown) to avoid interrupting production.

Angled lighting 189 is clearly obviously provided as stated above.

FIG. 24 (lateral view of the device of FIG. 23) also shows the displacement of the robot 160, with the application of an ink jet at 190 (to inscribe a bar code for example), the cutouts being arranged in a stack on the lifting platform as described above with reference to the other embodiments.

As it goes without saying and moreover as it results from what preceeds, the present invention is not limited to the embodiments that have been more particularly described. On the contrary, it embraces all the variants thereof and notably those in which the robot is different.

The invention claimed is:

1. A method for transferring cutouts from a magazine formed from at least one vertical stack of cutouts made of sheets of cardboard or corrugated cardboard material including notches, comprising a plurality of cycles of transfer of cutout, each cycle comprising the steps of:

illuminating a cutout on a top of the at least one vertical stack of cutouts in an angled manner in order to generate shadows produced by the notches and overlaps between one or more cutouts and disregarding the one or more cutouts which do not have a predetermined number of shadow zones as being below the cutout to seize;

locating a cutout on the top of the stack by at least a digital camera located above the magazine by imaging the cutout on the top of the stack, and transmitting data obtained from the imaging to a computer, wherein the digital camera is centered with respect to the magazine;

determining the cutout on the top of the stack from dimensions of the vertical stack of cutouts to be located in a pick-up plane and from an image obtained by the digital camera by computing a presence of four or more shadow zones and a distance between the zones and computing a barycenter and the angle of the cutout on the top of the stack in relation to a reference position;

preliminarily detaching the cutout on the top of the stack from a rest of the vertical stack of cutouts, the preliminarily detaching being undertaken by lifting up one or several sides of the cutout on the top of the stack, grasping the cutout on the top of the stack by suction by communicating the computed barycenter and angle of the cutout on the top of the stack to a robotic arm which is provided with suction tooling, and by controlling the robotic arm in order to align the suction tooling with a lining-up of the cutout on the top of the stack before grasping it by suction by way of the tooling, displacing the cutout on the top of the stack by the robotic arm; and releasing said cutout on the top of the stack at a following station for or prior to forming a packaging box; and repeating the above cycle of steps at a rate of more than thirty cycles per minute, with successive cutouts regularly advanced at the top of the stack.

2. The method as claimed in claim 1, characterized in that the cutout is glued prior to releasing said cutout at the following station, wherein the following station is a forming station.

3. The method as claimed in claim 1, wherein the magazine comprises several rows and/or several stacks of cutouts, the grasping of the cutout on the top of the stack is provided from the rows or stacks.

4. The method as claimed in claim 1, further comprising using several robotic arms operating alternately.

5. The method as claimed in claim 1, wherein the magazine comprises a pallet, the method further comprising:
placing the pallet on a lifting device,
raising a top of the pallet as far as up to an observation and pick-up plane,
detecting the cutout on the top of the stack; and,
grasping the cutout on the top of the stack by suction in order to be taken to the following station.

6. The method as claimed in claim 1, further comprising the steps of, in order to grasp the cutout on the top of the stack by suction, positioning suction cups at different points on the cutout, then lifting at one or several sides of the cutout whilst part of the cutout is blocked, in order to create at least one lateral air inlet.

7. The method as claimed in claim 1, further comprising the step of forming a box from a cutout consisting of a series of at least four principal sections terminated by a fastening tab, the series of at least four principal sections being connected together by a first folding lines parallel with one another, the series of at least four principal sections forming outer walls of the box and being connected on one side to a series of flaps by a second folding lines perpendicular to the first folding lines, to form a base of the box.

8. The method as claimed in claim 1, wherein the method comprises a marking step after the cutout on the top of the stack is gripped by a robot and prior to the cutout on the top of the stack being deposited at a following station.

9. The method according to claim 1, further comprising the step of blowing air on the cutout on the top of the stack from underneath.

10. The method as claimed in claim 1, wherein the method is arranged for producing a packaging box with a polygonal cross section and wherein the following station is for or prior to forming said packaging box.

11. The method as claimed in claim 10, wherein the forming is effected by a punching action in a cavity.

12. The method as claimed in claim 10, wherein the forming of the packaging box at the following station is effected by rolling the cutouts around a determined volume.

13. The method as claimed in claim 10, wherein grasping the cutout on the top of the stack is performed by suction cups displaced along a horizontal axis by a robotic arm at a speed of translation of between 4 m/s and 6 m/s inclusive.

14. The method as claimed in claim 13, further comprising the step of transferring the cutout to the forming station by an element with two carriages on which a robotic arm is mounted, while actuating the element by a drive system including a belt and pulley arrangement with electric motors.

15. An apparatus for transferring cutouts from a magazine formed from a vertical stack of cutouts made from sheets of cardboard or corrugated cardboard material including notches, the apparatus comprising:
a digital camera positioned over the magazine;
an illumination system positioned to illuminate the cutouts in an angled manner;
a computer programmed to receive images of the illuminated cutouts from the digital camera; and
a robotic arm having a plurality of suction cups and at least one blocking member that blocks a portion of one of the cutouts, the plurality of suction cups and the at least one blocking member together configured to preliminarily detach a top one of the cutouts from the vertical stack,
wherein the computer is programmed to receive an image of the illuminated cutouts, compute a presence of four or more shadow zones and a distance between the zones, compute a barycenter and the angle of the top one of the cutouts in relation to a reference position, determine an orientation of the top one of the cutouts in relation to a reference cutout by detecting the notches, and wherein the computer controls the robotic arm to reposition in space during movement based on the determined orientation, preliminarily detach the top one of the cutouts from the vertical stack, and to release the top one of the cutouts at a station after moving the top one of the cutouts from the magazine.

16. The apparatus of claim 15, further comprising an air inlet arranged to blow air underneath the top one of the cutouts.

17. The apparatus of claim 16, wherein the computer and the robotic arm are arranged to repeatedly move cutouts from the magazine at a rate exceeding thirty cycles per minute.

* * * * *